May 14, 1929.  J. C. COULOMBE  1,713,265
VACUUM TANK FOR FUEL FEEDING
Filed March 5, 1925   3 Sheets-Sheet 1
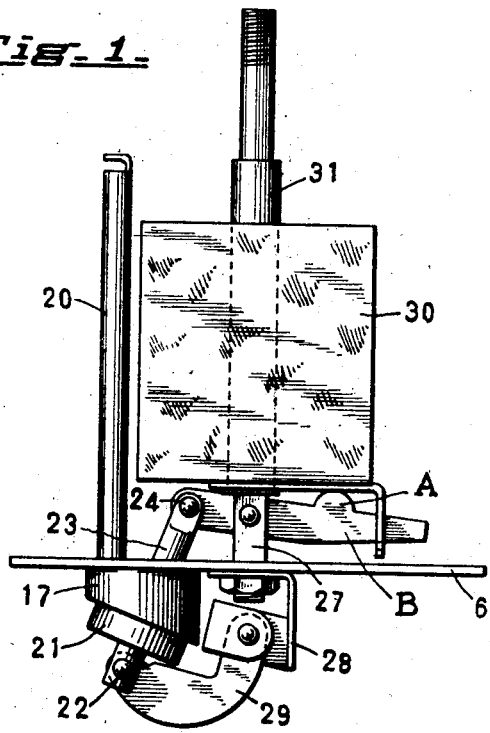
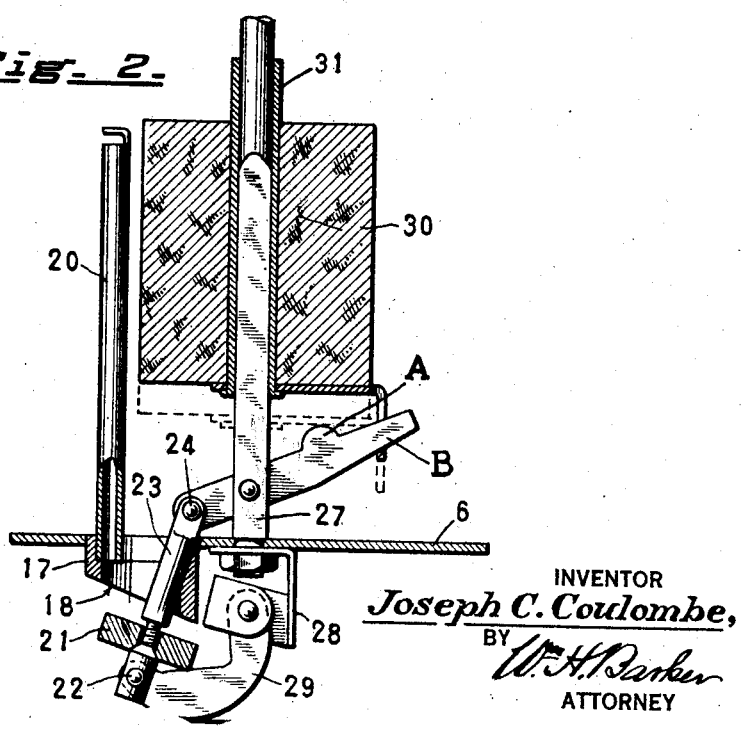
INVENTOR
Joseph C. Coulombe,
BY
ATTORNEY May 14, 1929.  J. C. COULOMBE  1,713,265
VACUUM TANK FOR FUEL FEEDING
Filed March 5, 1925  3 Sheets-Sheet 2
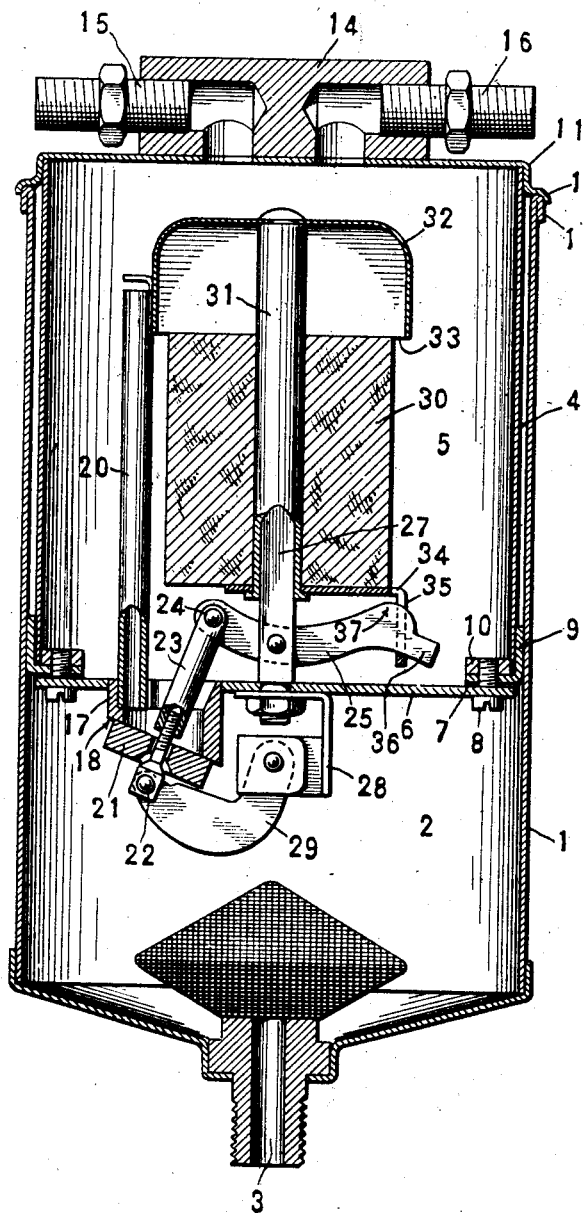
Fig. 3.
Fig. 4.
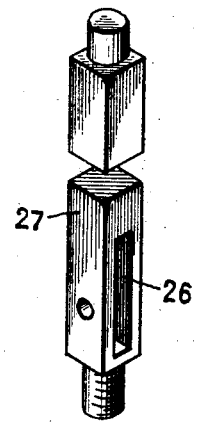
Fig. 5.
INVENTOR
Joseph C. Coulombe,
BY
ATTORNEY

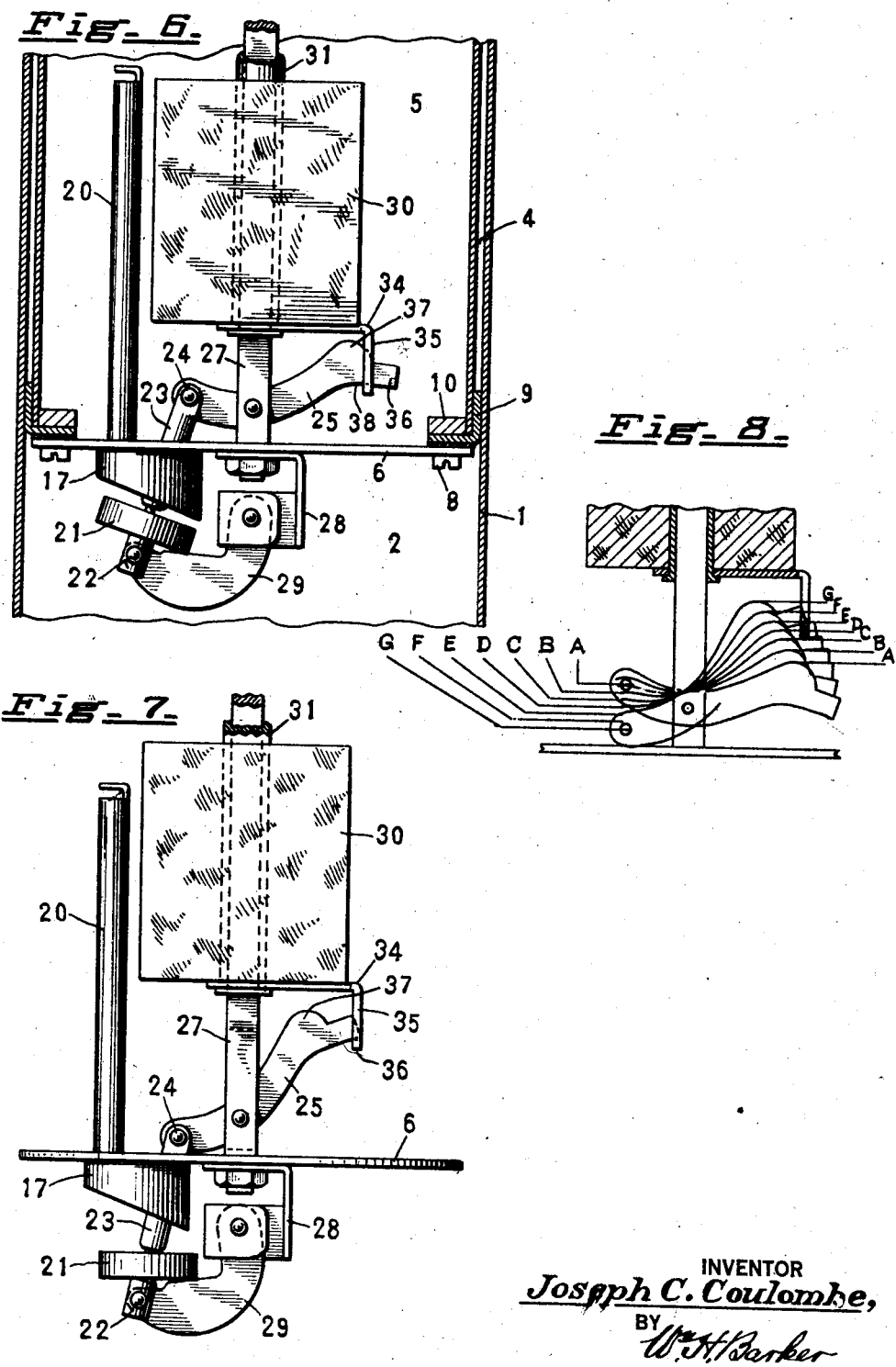

Patented May 14, 1929.

1,713,265

UNITED STATES PATENT OFFICE.

JOSEPH C. COULOMBE, OF KOKOMO, INDIANA.

VACUUM TANK FOR FUEL FEEDING.

Application filed March 5, 1925. Serial No. 13,225.

This invention relates to vacuum tanks and is particularly directed to a novel arrangement of the valve and float mechanism for controlling the pumping action of such a device.

The main object of the invention is to provide for minimum sizes of floats for effecting certain and rapid operation of the valve mechanism so that the speed of pumping may be materially increased in any given size of apparatus.

A further object is to simplify the constructions providing for ease in assembly with certainty of operation.

Referring to the drawings:

Fig. 1, is a view in elevation of the float valve mechanism.

Fig. 2, is a similar view, partially in section with the float raised.

Fig. 3, is is vertical section showing assembly of the elements of the tank.

Figure 4, is a detailed fragmentary view of the valve and separating plate.

Figure 5, is a perspective view of the float and valve lever support.

Figure 6, is a sectional view of an alternative, and possibly preferred form of valve lever.

Figure 7, illustrates the valve lever and float in open valve position.

Figure 8, is a diagrammatic view illustrating the action of the valve lever and float.

In devices of this character, it has heretofore been a common practice to employ either a hollow metal float or a cork float and the reactive buoyancy effects of such floats have been relied upon to open and close certain valve mechanisms.

The hollow valve float is objectionable, as it is liable to corrosion and perforation and thus becomes "gas logged".

The cork float is also subject to overweight through absorption of the liquid.

These floats have ordinarily been of cylindrical forms and where cork is employed, there is a great waste and unnecessary expense in cutting the cork to cylindrical form to which may be added, a further cost increment of labor in their production.

The present invention is directed to obviate, as far as possible, these defects by utilizing a cork float of rectangular form with a "float booster" or small metallic cup of light weight which will materially aid the lifting power of the cork float. This permits of the use of a comparatively small cork body which, being of rectangular form, may be cut out from cork sheets with a minimum of waste and which, when assembled and employed, as herein described, provides an effective float which, even though it becomes "gas logged", will still be effective for operating the mechanism.

In addition to the device of the composite float, there is also illustrated, a lever mechanism for the valve which will co-operatively act, with the float, to give variable leverages, for moving the valve, at predetermined positions of the float, thus insuring predetermined and certain valve actions with a float of comparatively small dimensions.

These various features are so corelated and coalesced into a single structure, providing simplicity in manufacture, economy in manufacture and assembly, and a substantial reduction in the size of elements employed to provide a pump of adequate capacity and one which will operate with great certainty.

It has now become essential to this character of device, that they operate continuously for long periods of time without attention and in the event of unforeseen clogging, that they may be readily accessible for cleansing.

In the present device, these features are amply provided for and a "unit" structure valve and float mechanism is provided which gives immediate accessibility for inspection without liability of displacement of any of the parts.

Referring to Figure 3, there is an outer casing 1, which provides a delivery chamber 2, which is connected to a carburetor through a suitable coupling and nipple 3, so that liquid fuel is delivered by gravity from the chamber 2, to the carburetor.

This outer casing 1, has slipped within it, a casing 4, of an operating chamber 5. This is closed at the bottom by a plate 6, and gasket 7, through binding screws 8, which pass through an annular flange 9, and stiffening ring 10.

There is a head 11, having a flange 12, overlying the upper turned edge 13, of the casing 1.

Upon the head 11, there is a connecting block 14, which serves for a fuel connection 15, and suction connection 16. The latter may be connected with any source of suction, as the intake manifold of the engine, or any pumping device.

Ordinarily, the tank, as described, is located at a higher level than the main fuel tank and is connected to the latter through a suitable duct, connecting with the fuel connection 15.

The plate 6, forms a separating plate between the operating chamber 5, and the distributing chamber 2. The latter is under atmospheric tension, there being a loose fit between the casings of respective chambers. The plate 6, bears all of the operating mechanism located in the chamber 5, as well as the valve mechanism which projects below the plate.

Dependent from the plate 6, is a tubular member 17, which has an angularly disposed valve seat 18. At its upper end it is provided with an inturned ring 19, which provides a finished means of holding a riser 20, of tubular form, which extends upwardly into the operating chamber 5, above the point of the high liquid level of said chamber.

A valve 21, co-operates with the valve seat 18, to open and control the flow through the tubular member 17, between the chambers 5, and 2.

The valve, as illustrated, is in compound form having a main valve 21, and an auxiliary relief valve 22, seated in the main valve 21. This relief valve permits the use of a large main valve and valve opening and insures opening of the main valve 21, under float action, even with the chamber 5, under high sub-atmospheric tension.

The stem of the valve 22, is adjustable in a connecting link 23, pivoted as at 24, to a valve lever 25. Said lever 25, passes through a slot opening 26, in a rectangular support 27.

This support 27, is secured to the bottom plate 6, and the nut which binds it, also secures a dependent angle plate 28, that in turn serves as a support for a pivoted valve guide lever 29, the outer end of the latter is pivoted to the valve 22, the end of said lever being bifurcated to straddle the plate 29.

The rectangular support 27, also serves as a guide for the float. This, as illustrated, consists of a rectangular cork body 30, secured to a hollow guide member 31, at the upper end of which guide member is an inverted cup 32, the lower edge of which is on the line of the float. This cup is of cylindrical form and inasmuch as the float body 30, is of rectangular form, there are free spaces as at 33, for the ingress of air and egress of liquid from the inverted cup 32.

The lower end of the float tube 31, is spun over or otherwise clamped against the plate 34, which has a slotted dependant arm 35, through which passes the end 36, of the valve lever 25.

This lever, as will be noted, in Figs. 3 and 6 to 8 of the drawings, is of somewhat peculiar form having a cam surface 37, which rides along the plate 34, during the downward movement of the float, gradually increasing the length of the lever between the fulcrum point and point of contact with the float so that a greater leverage is exerted in closing the movement of the valve as the float descends.

The under side of the valve lever is also of cam form, as at 38, and is co-operatively designed with reference to the cam surface 37. As the float rises, the leverage is increased by the mechanism to secure opening movement of the valve inasmuch as the lower edge or cam 38, of the lever 25, rides along the lower portion of the groove of the dependent plate 35. This feature of variable leverage, during the lift of the float, is illustrated in Figures 7 and 8, where at the right of Figure 8, A, represents a position of the lever or the corresponding position of A, at the left hand end of the lever, while G, at the right hand, represents the position of contact of the lever with the valve in open position as indicated by G, at the left.

It will be noted that there is a certain lost motion between the float and the lever and this permits of the initial opening of the relief valve 22.

Figure 3, shows the float just rising and about to open the relief valve.

Figure 6, shows the float in a slightly elevated position just after it has started to open the main valve while Figure 7, illustrates the float at its high point with the main valve and relief valve fully open.

By reference to Figure 8, it is apparent, from the high point of the high position of the cam surface 37, indicated at G, at the right in Figure 8, and the position at A, that there is a gradual increasing leverage upon the descent of the float to its lowermost position. Similarly, there is an increasing leverage due to the change of point of contact of the cam surface 36, and the dependent member 35, during the rise of the float.

It will be quite apparent that, as the float is immersed to its buoyant point and begins to rise, the leverage on the valve mechanism is increased and due to this increase and the angular position of the cam 36, as soon as the float approaches its full buoyancy, there will be a decided snap action to open and hold open the valve. Of course, the flow of fuel from the chamber 5, to the chamber 2, aids in the opening of the valve and similarly the sub-atmospheric condition of the chamber 5, will aid somewhat in closing the valve as it approaches its seat. However, with the variable leverage arrangement illustrated, it is possible to employ a comparatively small float for the opening and closing of a comparatively large valve.

In Figures 1 and 2, a similar mechanism is employed, to which reference characters have been given, as in Figures 3 to 8, with the exception of the valve lever.

In these Figures 1 and 2, the valve lever has an upper cam A, and a lower cam B, although the relative position and design of these cam surfaces do not provide so great a variation of leverage as is secured in the form heretofore described.

Obviously, the exact form of lever may be modified to any reasonable extent, and cams may be designed to suit the exigencies of any particular requirements without departing from the spirit or intent of the invention which mainly includes a variable leverage for the valve which will co-operatively react upon the rising and falling movements of the float.

Attention is also directed to the advantageous uses in which this device may be employed. Inasmuch as equilibrium between the operating chamber and the distributing chamber 2, is established through the valve opening through the plate 6, there will be a rise of lighter fluids, such as air or saturated vapors from the chamber 2, to the chamber 5, said chamber 2, being under atmospheric tension.

By dispensing with the riser tube 20, this upward surging may be utilized for aerating or vaporizing purposes, in which case, all of the air or fluid vapor carried up through the body of the liquid in the chamber 5, from the chamber 2, will pass through the liquid of the chamber 5, to equalize the pressure in said chambers 2 and 5, therefore, a liquid of greater or less viscosity may be raised from the lower level to the chamber 5, and aerated in its passage from said chamber to any given point of destination. This makes the device particularly advantageous for use in connection with the oil of engines.

By attaching inlet 15, to the crank case below the oil level, or to any convenient well, connected with the engine, the oil will be drawn up into the working chamber 5, and will pass downward through the valve opening and chamber 2, to any suitable receptacle where it may be utilized for lubrication.

By so using the device, dilution of the oil used for lubricating purposes in the engine, may be successfully avoided and, of course, the lower chamber may contain a suitable screen or strainer as indicated, for filtering the oil, just as liquid fuel is filtered. It will, therefore, be apparent that the device herein described is not limited in its uses to the feeding of fuel to a gas engine, as it may equally well be employed with lubricating oils or other materials where it is desirable to secure an aerating effect.

The stand tube 20, is shown in the drawings and, of course, where areation is not desired to its fullest extent, this stand tube serves to give a quick release and equalization of the pressures between the operating chamber 5, and distributing chamber 2.

As soon as the auxiliary valve 22, is opened, fluid will pass to lower the suction effect of the operating chamber and immediately, therefore, the main valve 21, opens allowing immediate equalization. The lighter fluid will readily pass up through the stand tube 20, thus leaving a clear flow of liquid through the main valve opening.

When it is desired to utilize the device taking full advantages of its possible aerating effect, the stand tube 20, may be dispensed with. Thereupon, the flow of fluid is entirely through the valve opening and the body of liquid of the chamber 5.

In this case, the operation of the pump will not be quite as rapid as with the stand tube, but of course, there is not such need of rapid filling and dumping when aerating the liquid.

It is, of course, to be understood that the variable leverage device interposed in the connections between the valve and float is applicable to any arrangement of a valve or valves for controlling the pressures in the operating chamber, filling and emptying of which is periodic, and occurs upon different positions of the float, due to the level of the contents of the chamber.

What I claim as my invention and desire to secure by Letters Patent is:

1. In a device of the character described, an operating chamber, having a suction connection and a liquid supply connection, a discharge valve for the chamber, a float controlling the discharge valve and a lever connection between the float and discharge valve, said lever connection giving an automatic variable leverage between the float and valve.

2. In a device of the character described, an operating chamber, having a suction connection and a liquid supply connection, a discharge valve for the chamber, a float controlling the discharge valve, a lever for opening and closing the discharge valve and means appurtenant to the lever for automatically varying the leverage of said lever between the valve and the float.

3. In a device of the character described, an operating chamber, having a suction connection and a liquid supply connection, a discharge valve for the chamber, a float controlling the discharge valve and a variable leverage device reacting automatically between the discharge valve and float during the operating movements of the float.

4. In a device of the character described, an operating chamber, having a suction connection and a liquid supply connection, a discharge valve for the chamber, a float controlling the discharge valve and means cooperatively related with the float for varying the reaction of the float on the valve during the closing movements of the valve.

5. In a device of the character described, an operating chamber, having a suction connection and a liquid supply connection, a discharge valve for the chamber, a float controlling the discharge valve and means cooperatively related with the float for varying the reaction of the float on the valve during the opening movements of the valve.

6. In a device of the character described, an operating chamber, having a suction connection and a liquid supply connection, a discharge valve for the chamber, a float controlling the discharge valve and means cooperatively related with the float for varying the reactions of the float with reference to the valve during the opening and closing movements of the valve.

7. In a device of the character described, an operating chamber, having a suction connection and a liquid supply connection, a compound discharge valve for the chamber, a float controlling the compound discharge valve and a lever providing a variable leverage connection between the float and compound discharge valve.

8. In a device of the character described, an operating chamber having a suction connection and a liquid supply connection, a compound discharge valve and intermediate connections forming a variable leverage device between the compound discharge valve and float.

9. In a device of the character described, an operating chamber having a suction connection, a fluid connection and discharge connection, a valve controlling the discharge connection, a composite float having a body part and a fluid containing part operating therewith to increase the total buoyancy of the float and connections including a lever having a variable leverage for actuating the valve through movements of the float.

10. In a device of the character described, an operating chamber having a float, a support or float guide, a float mounted thereon, a lever pivoted to the float guide, an adjustable link connection at one end of said lever, a valve connected with the link, a cam contact between the opposite end of the lever and the float whereby the effective operation of the lever upon the float is varied at different positions of the float.

11. In a device of the character described, an operating chamber having a rectangular float, a support or float guide, a rectangular float mounted thereon, a lever pivoted to the float guide, an adjustable link connection at one end of said lever, a valve connected with the link, a cam contact between the opposite end of the lever and the float whereby the effective operation of the lever upon the float is varied at different positions of the float.

12. In a device of the character described, an operating chamber having a composite float consisting of a buoyant body part and buoyant air chamber, a support or float guide, a composite float mounted thereon, a lever pivoted to the float guide, an adjustable link connection at one end of said lever, a valve connected with the link, a cam contact between the composite end of the lever and the float whereby the effective operation of the lever upon the float is varied at different positions of the float.

13. In a device of the character described, an operating chamber having variable pressures for pumping a fluid, a valve mechanism for controlling the pressures, a float for controlling the valve mechanism and variable leverage device interposed in the valve mechanism between the valve and float.

JOSEPH C. COULOMBE.